United States Patent
Suzuki

(10) Patent No.: US 7,698,017 B2
(45) Date of Patent: Apr. 13, 2010

(54) ELECTRIC PRESS

(75) Inventor: Shinji Suzuki, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 234 days.

(21) Appl. No.: 11/974,601

(22) Filed: Oct. 15, 2007

(65) Prior Publication Data

US 2008/0201011 A1    Aug. 21, 2008

(30) Foreign Application Priority Data

Feb. 15, 2007    (JP) ............................. 2007-034273

(51) Int. Cl.
G06F 19/00    (2006.01)
B21J 9/20    (2006.01)

(52) U.S. Cl. .................. 700/206; 700/177; 72/20.1; 100/348

(58) Field of Classification Search .............. 700/79, 700/177, 206; 72/20.1; 100/43, 348
See application file for complete search history.

(56) References Cited

U.S. PATENT DOCUMENTS 5,031,431 A * 7/1991 Naito .................. 72/21.5
6,145,366 A * 11/2000 Yamada ................. 72/443
7,086,262 B2 * 8/2006 Suzuki et al. ............ 72/20.1
2005/0081587 A1 * 4/2005 Suzuki et al. ............ 72/20.1

FOREIGN PATENT DOCUMENTS

JP        10-277800        10/1998

* cited by examiner

Primary Examiner—Albert DeCady
Assistant Examiner—Douglas S Lee
(74) Attorney, Agent, or Firm—Weingarten, Schurgin, Gagnebin & Lebovici LLP

(57) ABSTRACT

The electric press is provided with a main CPU 1 and a sub CPU 3, the main CPU 1 being responsive to a signal from a servo driver 10 to give an detecting signal to a relay 2 when a ram 51 is located in a predetermined position, thereby to give a mute signal to an area sensor 30 and the sub CPU 3 being responsive to a signal from an encoder 9 to give a detecting signal to a relay 4 when the ram is located in a predetermined position, thereby to give a mute signal to the area sensor 30. The main CPU 1 and sub CPU 3 watch each other, that is, the main CPU 1 checks the output of a relay 4 and turns the relay 2 off when the mute signal is not produced from the relay 4. The conditions of sub CPU and main CPU are compared with each other. In case the two conditions are in accord with each other, it is decided that the relay 4 is out of order. The sub CPU 3 makes the same check operation in connection with the relay 2.

5 Claims, 3 Drawing Sheets

ELECTRIC PRESS

This application claims priority to Japanese application No. 2007-034273 filed Feb. 15, 2007.

BACKGROUND OF THE INVENTION

The present invention relates to an electric press.

Generally the electric press is provided with an electric motor as a drive source for moving the ram up and down relative to a work which is to be processed with application of pressure. In this connection, the electric press is generally provided with an area sensor for instantly stopping the drive source in case of emergency in order to prevent accidents, for example, in case the operator happens to come into a predetermined area around the electric press while the electric press is driven.

On the other hand, it is required that the operator enters the predetermined area in connection with the electric press to give teaching to the electric press accordingly in case the work to be processed is changed and/or the operation mode is changed. The electric press is, therefore, provided with a device for giving a muting signal to the area sensor to invalidate the same while the electric press ram is in a predetermined condition such as in a standby condition.

JP-A-10-277800 may be referred to as a prior art.

However the CPU (Central Processing Unit) may happen to run in uncontrolled condition. Under such circumstances, the danger is that the area sensor invalidating device may be operated when the electric press is not in the standby condition, and the area sensor is not operated. Therefore, the electric press may be provided with a plurality of CPU's for watching an watchdog signal to detect the uncontrolled running condition of the CPU. However this technique is not so reliable because the watchdog signal is made up by software and it is assumed that the programs may run in uncontrolled condition at the time of uncontrolled running of CPU.

It is, therefore, an object of the invention to solve the problems of the prior art.

SUMMARY OF THE INVENTION

In order to attain the object, the invention has been provided to realize an electric press having a ram that is operated to move relative to a work which is to be processed and an area sensor connected thereto for detecting a person entering a predetermined area in connection with the electric press, the electric press comprising detecting means for detecting a predetermined condition of the electric press, signal producing means that is responsive to the detection of the predetermined condition of the electric press by the detecting means to produce a signal for invalidating the area sensor while the electric press is in the predetermined condition, watching means for watching if the signal producing means is normally operating.

It is preferable that the detecting means includes a first detecting means and a second detecting means. It is preferable that the signal producing means includes a first signal producing means and a second signal producing means. It is preferable that the watching means includes a first watching means for watching if the first signal producing means is normally operating and a second watching means for watching if the second signal producing means is normally operating. Further it is preferable that the first and second signal producing means being prevented from producing the signal for invalidating the area sensor in case one of said first and second signal producing means is not normally operating.

The signal producing means and the watching means may be realized by one central processing unit (CPU). For example, a sub central processing unit may be provided to realize the first watching means for watching if the first signal producing means is normally operating and the second signal producing means. Further a main central processing unit may be provided to realize the second watching means for watching if the second signal producing means is normally operating and the first signal producing means.

Further the first detecting means is responsive to the drive signal of the drive motor of the electric press to detect the predetermined condition of the electric press and the second detecting means is operated to detect the position of the ram of the electric press, thereby to detect the predetermined condition of the electric press.

Further the predetermined condition of the electric press may be the condition that the ram is in a standby position or the ram is in the process of moving to the standby position.

The electric press of the invention is designed to perform safeguarded as is free of operation errors as to invalidation of the area sensor.

DETAILED DESCRIPTION OF THE PREFERRED EMBODIMENTS

The invention will be described in detail in reference to the embodiment as shown in the attached drawings.

Figure 1:
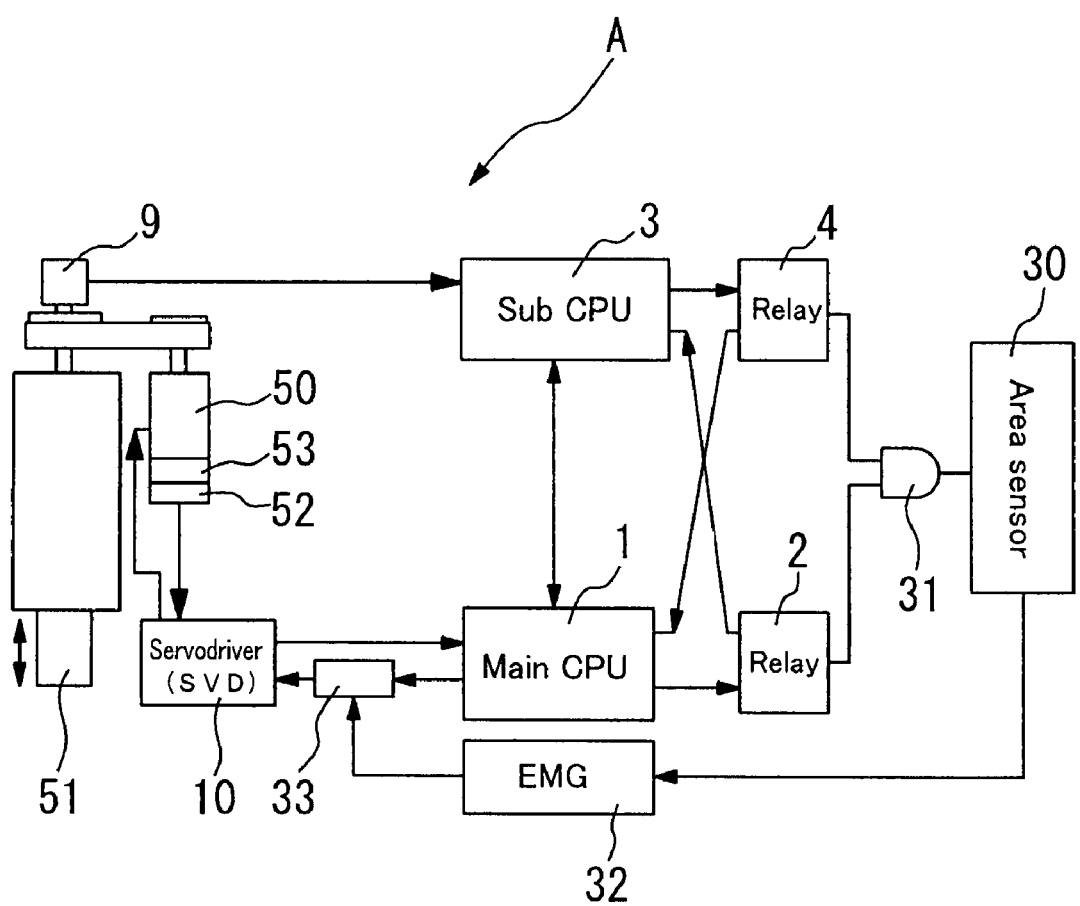
FIG. 1 is a block diagram of the invention showing one embodiment of the invention.

In FIG. 1, the electric press A is provided with a ram 51 which is moved up and down by a servomotor 50 that is driven as controlled by a main CPU 1 through a servodriver (SVD) 10.

The main CPU 1 numerically controls the rotation of the servomotor 50. The rotation of the servomotor 50 is converted by a screw mechanism into a straight line movement for moving the ram 51 up and down. The reference numeral 52 denotes an encoder and the reference numeral 53 denotes a brake. The main CPU 1 is responsive to a feedback signal from the encoder 52 to make numerical control of the rotation of the servomotor 50 through the servodriver 10.

The ram 51 has another encoder 9 provided therewith for directly detecting the position of the ram 51. The position detecting signal is transmitted to a sub CPU 3.

The sub CPU 3 and the main CPU 1 are so formed as to give the position detecting signal to each other.

The main CPU 1 is responsive to the signal from the encoder 52 to give the position detecting signal to the relay 2 when the ram 51 is located in a predetermined position, that is, according to the embodiment, in a standby position or while the ram is moving to the standby position. The relay 2 is responsive to the position detecting signal to give a mute signal to an area sensor 30. The area sensor 30 has an AND circuit 31 connected thereto. The area sensor 30 is invalidated in case the AND circuit 31 is turned ON with receipt of the mute signal from the relay 2 and the mute signal from a relay 4 which will be described hereinlater.

The area sensor 30 has an emergency governor (EMG) 32 connected thereto. The emergency governor 32 is connected to a power intercepting circuit 33. The power intercepting circuit 33 is provided between the main COU 1 and the servodriver 10 to intercept the signal from the main CPU 1, thereby to stop the electric press A.

The area sensor 30 is provided to detect an operator entering a predetermined area in connection with the electric press A and to operate the emergency governor 32 and the power intercepting circuit 33, thereby to stop the electric press A.

In case the area sensor 30 is invalidated, the electric press A is not stopped even if the operator enters the predetermined area. In the circumstances, the operator is able to make teaching to the electric press A in the predetermined area.

The sub CPU 3 is responsive to the signal from the encoder 9 detecting the position of ram 51 to give the relay 4 a signal indicating that the ram 51 is in the standby position or is moving to the standby position. The relay 4 is responsive to the position indicating signal to give a mute signal to the area sensor 30 through the AND circuit 31.

The main CPU 1 and sub CPU 3 have the functions as the means for watching each other in addition to the functions for giving the signals to invalidate the area sensor 30.

Precisely, the main CPU 1 gives the relay 2 the detecting signal detecting the condition of the ram 51 that is in the standby position or is moving to the standby position. At the same time, the main CPU 1 checks the output from the relay 4. In case the relay 4 is not producing the mute signal, the main CPU 1 turns the relay 2 OFF, thereby to prevent the relay 2 from producing the mute signal. Then the main CPU 1 gives the sub CPU 3 a signal indicating that the relay 4 is out of order. On the other hand, the main CPU 1 receives a signal from the sub CPU 3 indicating the condition of the bus CPU 3. The conditions of the two CPU's are compared. In case the two conditions are decided to be identical, the sub CPU 3 is decided to be in order while the relay 4 is decided out of order. In case the conditions of the two CPU's are decided not identical, the sub CPU 3 or the main CPU 1 is decided out of order.

Similarly, the sub CPU 3 gives the relay 4 the detecting signal detecting the condition of the ram 51 that is in the standby position or is moving to the standby position. At the same time, the sub CPU 3 checks the output of the relay 2. In case the relay 2 is not producing the mute signal, the sub CPU 3 turns the relay 4 OFF, thereby to prevent the relay 4 from producing the mute signal. Then the sub CPU 3 gives the main CPU 1 a signal indicating that the relay 2 is out of order. On the other hand, the sub CPU 3 receives a signal from the main CPU 1 indicating the condition of the main CPU 1. The conditions of the two CPU's are compared. In case the two conditions are decided to be identical, the main CPU 1 is decided to be in order while the relay 2 is decided out of order. In case the conditions of the two CPU's are decided not identical, the main CPU 1 or the sub CPU 3 is decided to be out of order.

On the basis of such decisions, errors may be indicated and/or the system may be stopped.

With such structure as mentioned above, in case something is wrong with any of the main CPU 1, sub CPU 3, servodriver 10, servomotor 50, encoder 52, encoder 9, relay 2, relay 4, the mute signal is prevented from being produced from the relay 2 and relay 4, and the area sensor will not be invalidated. Therefore, the safety may be ensured.

Figure 2:
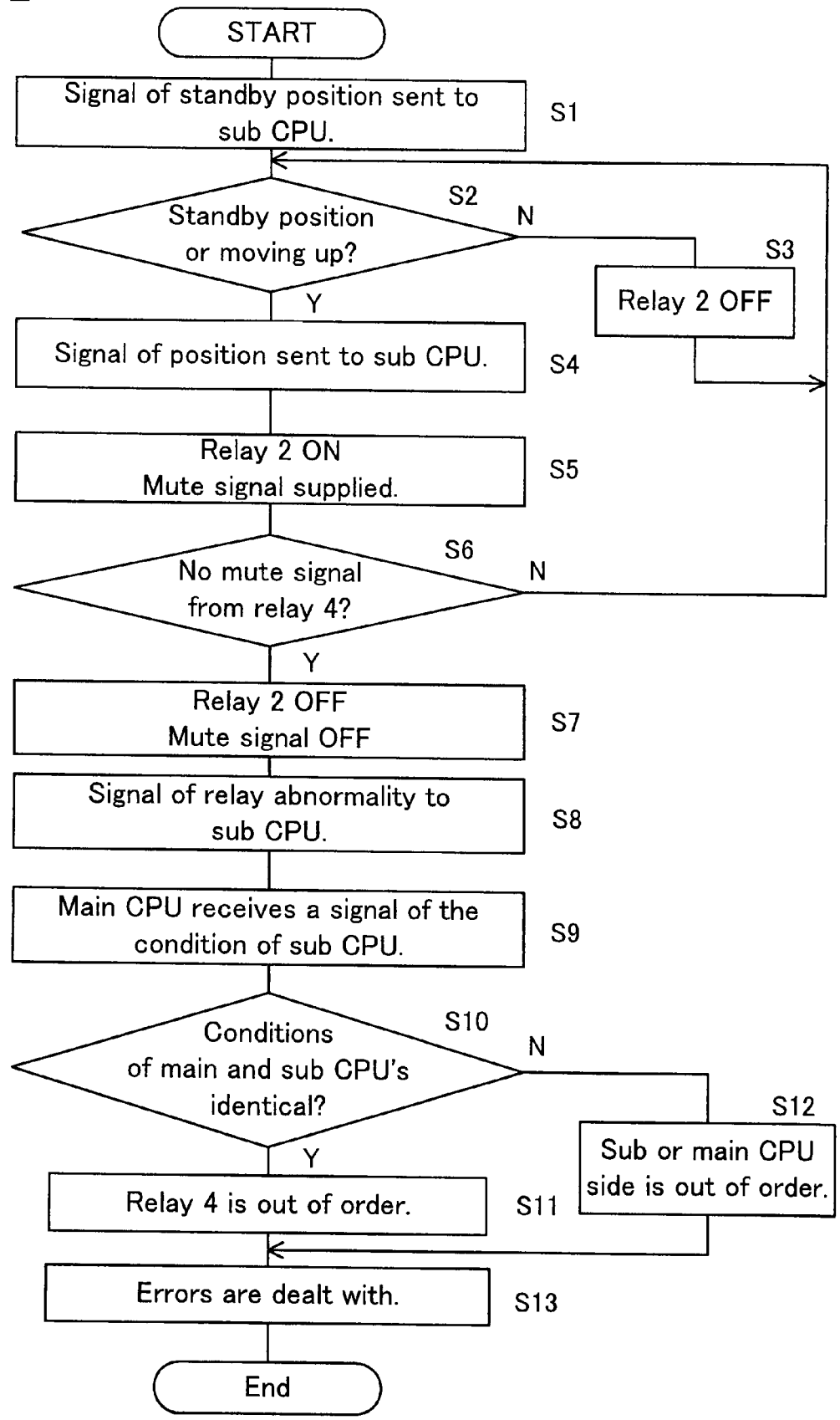
FIG. 2 is a flowchart of the invention showing the operation of one embodiment of the invention.
Figure 3:
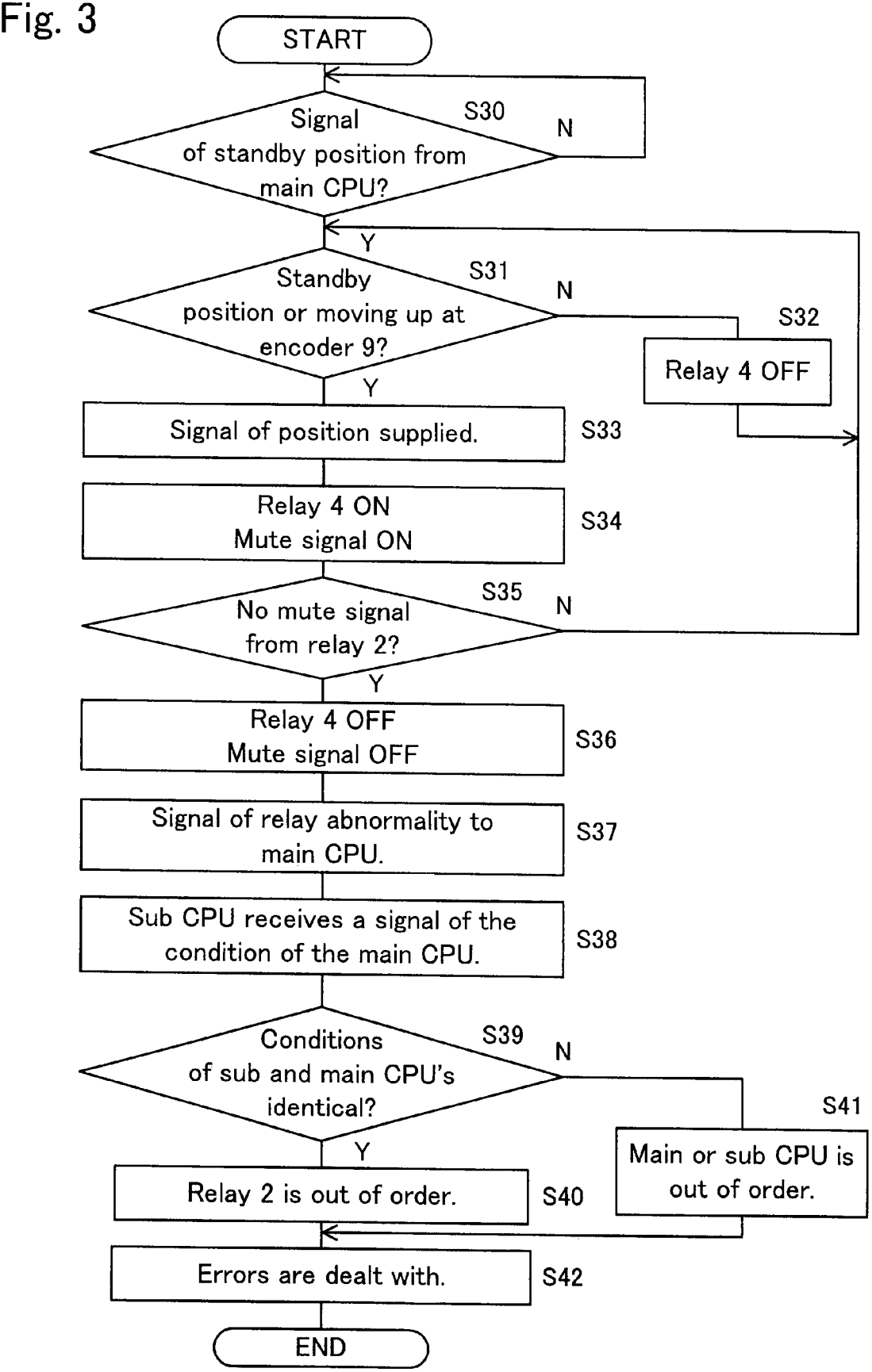
FIG. 3 is a flowchart of the invention showing the operation of one embodiment of the invention.

Subsequently the operation will be described in reference to FIGS. 2 and 3.

Firstly the operation of the main CPU 1 and the relay 2 will be described in reference to FIG. 2.

With the power source being switched ON, or at the time of change of standby position of the ram 51 made by teaching, the main CPU 1 gives the sub CPU 3 a signal indicating that the ram 51 is in a standby position and confirms that the ram 51 is in the same standby position (Step S 1).

Subsequently the main CPU 1 checks if the electric press A is in a predetermined condition. According to the embodiment, the main CPU 1 checks if the ram 51 is in the standby position or the ram 51 is in the process of moving up to the standby position (Step S 2). In case the ram 51 is in the standby position or in the process of moving up to the standby position, the CPU 1 gives a signal indicating the position of the ram 51 (Step S 4). In response to the position indicating signal from the main CPU 1, the relay 2 is turned ON and gives a mute signal to the area sensor 30 through the AND circuit 31 (Step S 5).

Incidentally in case the electric press A is not in the predetermined condition, the relay 2 is turned OFF to prevent the mute signal from being produced from the relay 2 (Step S 3) and the program returns to the Step 2.

Further the main CPU 1 watches the relay 4 which is located on the side of the sub CPU 3 and checks if the relay 4 is producing a mute signal (Step S 6). In case the relay 4 is producing the mute signal, the program returns the Step 2.

In case the relay 4 is not producing the mute signal, the main CPU 1 turns the relay 2 OFF to prevent the same from producing the mute signal (Step S 7). Then the main CPU 1 gives the sub CPU 3 a signal indicating that the relay 4 is out of order (Step S 8), and then receives a signal indicating the condition of the sub CPU 3 (Step S 9). The conditions of the main and sub CPU's are compared with each other (Step S 10). In case the two conditions are decided to be identical, it is decided that the sub CPU 3 is normal and the relay 4 is out of order (Step S 11). In case the two conditions are decided to be not identical, it is decided that the sub CPU 3 side or the main CPU 1 side is out of order (Step S 12), and then the errors are dealt with by way of indicating the errors or by way of stopping the system (Step S 13).

Subsequently the operation of the sub CPU 3 and the relay 4 will be described in reference to FIG. 3.

With the power source being switched ON, or at the time of change of standby position of the ram 51 made by teaching, the sub CPU 3 receives a signal from the main CPU 1 indicating that the ram 51 is in the standby position, and confirms that the ram 51 is in the standby position (Step S 30).

Subsequently the sub CPU 3 checks a signal from the encoder 9 indicating the position of the ram 51 and confirms if the ram 51 is in the standby position or the ram 51 is in the process of moving up to the standby position (Step S 31). In case the ram 51 is in the standby position or is in the process of moving up to the standby position, the sub CPU 3 gives a signal indicating the position of the ram 51 (Step S 33). In response to the position indicating signal from the sub CPU 3, the relay 4 is turned ON and gives a mute signal to the area sensor 30 through the AND circuit 31 (Step S 34).

Incidentally in case the ram 51 is not in the standby position or not in the process of moving up to the standby position, the sub CPU 3 turns the relay 4 OFF to prevent the same from producing a mute signal from being produced from the relay 4 (Step S 32) and the program returns to the Step 31.

Further the sub CPU 1 watches the relay 2 which is located on the side of the main CPU 1 and checks if the relay 2 is producing a mute signal (Step S 35). In case the relay 2 is producing the mute signal, the program returns to the Step 31.

In case the relay 2 is not producing the mute signal, the sub CPU 3 turns the relay 4 OFF to prevent the same from producing a mute signal (Step S 36). Then the sub CPU 3 gives the main CPU 3 a signal indicating that the relay 2 is out of order (Step S 37), and then receives a signal indicating the condition of the main CPU 3 (Step S 38). The conditions of the main and sub CPU's are compared with each other (Step S 39). In case the two conditions are decided to be identical, it is decided that the main CPU 1 is normal and the relay 2 is out of order (Step S 40). In case the two conditions are decided to be not identical, it is decided that the main CPU 1 side or the sub CPU 3 side is out of order (Step S 41), and then the errors are dealt with by way of indicating the errors or by way of stopping the system. (Step S 42).

The area sensor 30 is invalidated by an invalidating signal transmitted to the area sensor 30 when the AND circuit 31 is turned ON in case both of the relay 2 and the relay 4 are turned ON.

On the other hand, the area sensor 30 is not invalidated in case the detections of the main and sub CPU's are not identical as to the position of the ram 51. Further the area sensor 30 is not invalidated in case one of the relays 2 and 4 is out of order, or in case both of the relays 2 and 4 are out of order.

Therefore, the area sensor 30 is normally prevented from becoming the state of invalidation that may otherwise be caused due to the operation errors of system.

The invention being thus described, it will be obvious that the same may be varied in many ways. Such variations are not to be regarded as a departure from the spirit and scope of the invention, and all such modifications are intended to be included within the following claims.

What is claimed is:

1. An electric press having a ram that is movable relative to a work to be processed and having an area sensor connected thereto for detecting a person entering a predetermined area in connection with the electric press, said electric press comprising:

detecting means for detecting a predetermined condition of the electric press;

signal producing means that is structured and arranged to produce a signal to invalidate said area sensor whenever the detecting means detects that said electric press is in the predetermined condition; and watching means for determining whether or not watching said signal producing means if said signal producing means is operating correctly; wherein said detecting means includes a first detecting means and a second detecting means;

said signal producing means includes a first signal producing means and a second signal producing means;

said watching means includes a first watching means for watching if said first signal producing means is normally operating and a second watching means for watching if said second signal producing means is normally operating, said first and second signal producing means being prevented from producing the signal for invalidating the area sensor in case one of said first and second signal producing means is not normally operating.

2. The electric press as defined in claim 1, wherein said first detecting means is responsive to the drive signal from the drive motor of said electric press to detect said predetermined condition of said electric press;

said second detecting means is operated to detect the position of the ram of said electric press, thereby to detect said predetermined condition of said electric press.

3. The electric press as defined in claim 1, further comprising: a sub-central processing unit for realizing said first watching means which watches if said first signal producing means is normally operating and for realizing said second signal producing means, and a main central processing unit for realizing said second watching means which watches if said second signal producing means is normally operating and for realizing said first signal producing means.

4. The electric press as defined in claim 1, wherein said predetermined condition of said electric press is a condition wherein said ram is in a standby position.

5. The electric press as defined in claim 1, wherein said predetermined condition of said electric press is a condition wherein said ram is in the process of moving to a standby position.

* * * * *